April 22, 1930. A. L. LOEHR 1,755,699
DISPENSING MACHINE
Filed Nov. 23, 1929  2 Sheets-Sheet 1
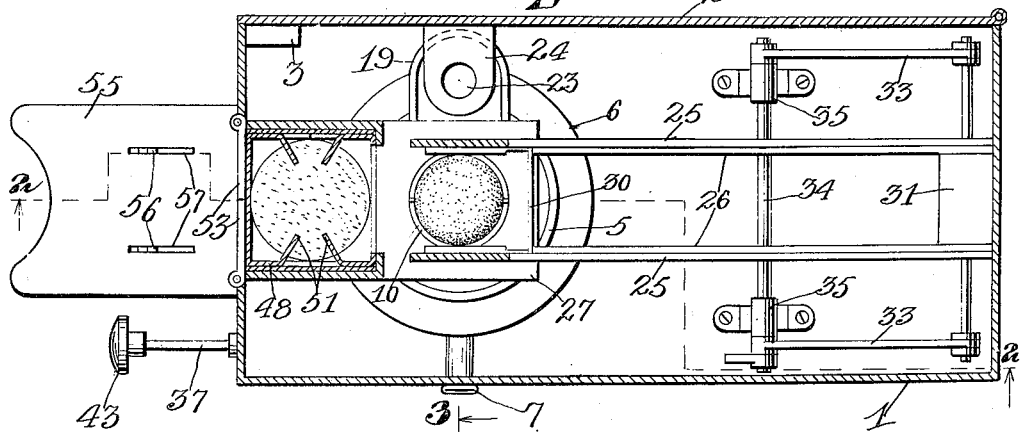
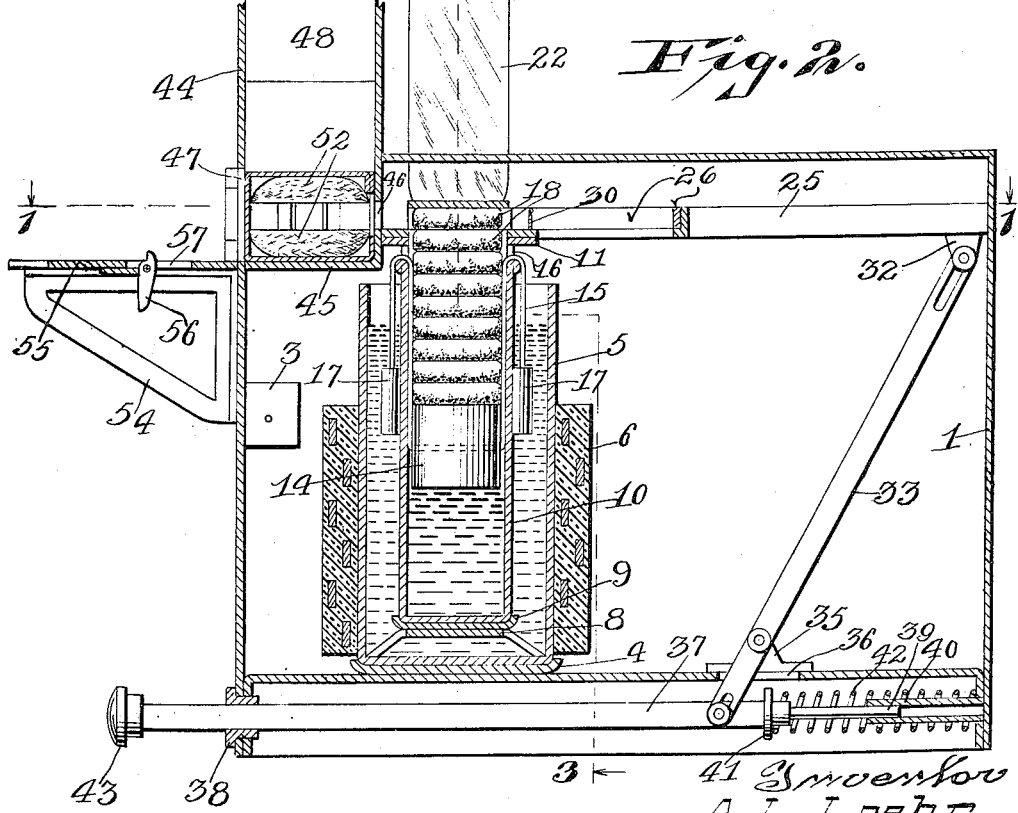

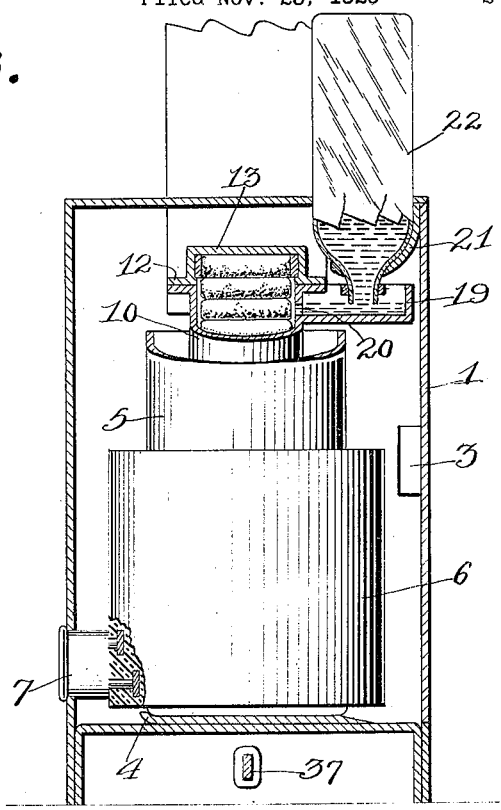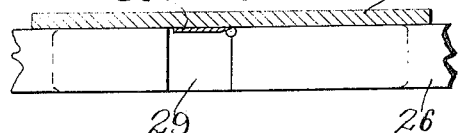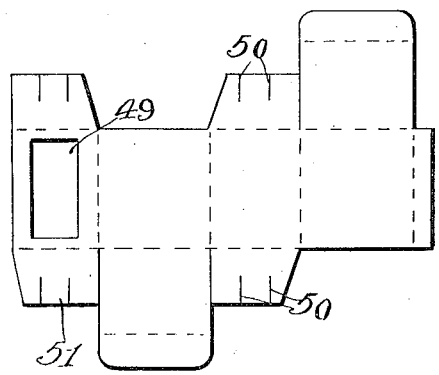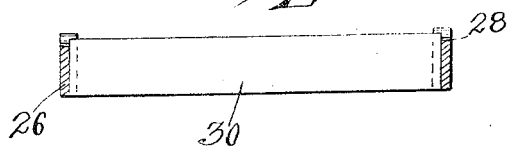

Patented Apr. 22, 1930

1,755,699

UNITED STATES PATENT OFFICE

ALEXANDER L. LOEHR, OF MILWAUKEE, WISCONSIN, ASSIGNOR OF ONE-THIRD TO HENRY F. STOCK, OF WAUKESHA, WISCONSIN

DISPENSING MACHINE

Application filed November 23, 1929. Serial No. 409,260.

This invention relates to new and useful improvements in dispensing machines and more particularly to a machine which is adapted to form and dispense sandwiches.

One of the objects of my invention is the provision of a dispensing machine which is particularly adapted for use in dispensing filled sandwiches and includes means for retaining the filler in position to be readily dispensed and at the same time keeping the same in a heated condition, whereby the filler can be readily placed between the halves of a roll or two slices of bread, and the entire sandwich then dispensed from the machine.

Another object of my invention is the provision of a dispensing machine wherein means is provided for dispensing a filler to position the same between a roll or the like, which is contained within an individual container and the entire sandwich and container then dispensed from the machine.

A further object of my invention is the provision of a sandwich dispensing machine wherein the fillers for the sandwiches are maintained in a heated condition and one of the fillers is always in position ready to be positioned between the outside layers of the sandwich, the layers being positioned in spaced relation in suitable containers so that the filler can be readily moved between the layers and as the outside layers are arranged within a suitable container an entire sandwich within a sanitary container can be dispensed from the machine.

A further object of the invention is the provision of a sandwich dispensing machine which includes a liquid container surrounded by a an electric heater, the container having positioned therein a plurality of fillers arranged one above the other, with one of said fillers always in position to be dispensed, and means for urging the remaining fillers into position when the outermost filler has been dispensed, together with means for maintaining a normal level of liquid within the heating chamber so that the fillers will be maintained in a heated container at all times.

A still further object of the invention is the provision of a sandwich dispensing machine wherein the outside layers which may be two pieces of a bun, a roll, or two slices of bread are positioned within a sandwich container and normally maintained in spaced relation for receiving between the two layers a filler, and these sanitary containers are positioned to be fed consecutively to a position to receive the fillers whereby a completed sandwich within the sanitary container can be dispensed from the machine.

With the above and other objects in view, the invention consists in the novel features of construction, the combination and arrangement of parts hereinafter more fully set forth, pointed out in the claims and shown in the accompanying drawings wherein:

Figure 1 is a horizontal sectional view on the line 1—1 of Figure 2;

Figure 2 is a longitudinal sectional view on the line 2—2 of Figure 1;

Figure 3 is a transverse sectional view on the line 3—3 of Figure 2;

Figure 4 is a detail section through the dispensing fork;

Figure 5 is a transverse sectional view through the support for the dispensing fork, illustrating the pusher in operative position; and, Figure 6 is a plan view of a blank to which my improved sanitary container is constructed.

In the present invention, it is my purpose to provide a dispensing machine which is particularly adapted for dispensing hamburger sandwiches in a sanitary container, the fillers for the sandwiches being normally maintained in a receptacle which is heated so that as the sandwiches are dispensed, the person receiving them from a machine will receive a hot sandwich, and it will be apparent that although the machine described and illustrated is particularly adapted for hamburger sandwiches, other types of fillers can be used in place of the hamburger and dispensed equally as well.

In constructing a dispensing machine in accordance with my invention, I provide a housing or casing 1 in which the ingredients and the operative parts are maintained. This housing 1 is provided at one side with a hinged door 2 normally maintained in a closed position by means of a lock 3 which may be of any ordinary type.

Within the container, I provide a supporting base 4 for a container 5 preferably adapted for containing water or other suitable heating fluid and around this container 5, which in the present instance is disclosed as circular in form, I arrange an electric heating element, this having an attaching socket 7 whereby a suitable source of electricity may be supplied to the heating element.

Within the bottom of the container 5 is a supporting standard 8 having a saucer-like top 9 which receives the lower end of the filler container 10. The upper end of the filler container 10 is provided with an annular flange 11, cooperating with a similar flange 12 on a cap 13. This cap not only extends over the upper end of the container 10 but forms a guide for the dispensing fork which will be described more fully hereinafter.

Movably mounted within the container 10 is a float 14 and attached to the float are cables 15 which extend upwardly in the container 10 and out through suitable openings 16 adjacent the top flange 11. The cables after passing out through the container 10 extend downwardly upon the outer side thereof and have attached thereto the weights 17.

In placing the fillers 18 in position within the container, it is preferable to have the float 14 disposed at the bottom of the container and then place the fillers 18, one upon the other upon the float. In order to maintain the fillers in a heated condition, it is essential that a heating fluid such as grease be placed within the container around the fillers, thus when the heating element is in operation, the fluid within the container 5 will be heated, which in turn will heat the grease or similar material in the container 10. In order to fill the container 10 during the dispensing of the fillers 18, I prefer to fill up the space beneath the float 14 with water, while the upper portion of the container which contains the fillers will have the liquid grease therein which will always be maintained on top of the water, so that the water will not necessarily come in contact with the fillers.

In order to provide for a continuous flow of water within the container 10 while the fillers are being dispensed, a shallow level basin is carried by one side of the container 10 at the upper end thereof and communicates with the interior of the container by means of an opening 20. Within the housing 1 is a supporting member 21 which is adapted to support, in an inverted position, a bottle container 22, the neck of which extends downwardly through an opening 23 in the guide bracket 24, the outer end of the neck normally projecting into the fluid in the level basin 19 so that when the bottle container 22 is in an inverted position, the fluid therein will run out of the bottle and into the container 10.

The water, however, will pass through the liquid grease and reach the bottom of the container 10. Extending horizontally within the housing 1 are the parallel rails 25 which form suitable guides for the side portions 26 of the dispensing fork. The forward ends of the rails 25 are extended onto a platform 27 which support these rails at this end.

The dispensing fork comprises two side rails 26 which have suitable bearing recesses 28 adjacent their forward ends and are also cut away to form the oppositely disposed recesses 29. A push plate 30 is provided with oppositely disposed trunnions positioned within the recesses 28 to pivotally mount this plate, the ends of the plate being movable within the opposed recesses 29. The ends of the side portions 26 opposite the platform 27 are connected by means of a block 31 carrying downwardly projecting perforated ears 32 which are pivotally and slidably connected to the upper ends of the movable arms 33. These arms are pivotally mounted upon a transverse shaft 34 supported in spaced bearings 35 in the bottom of the housing. The lower end of the arms 33 extend through slots 36 in the bottom of the housing and are pivotally and slidably connected to a plunger 37.

The plunger 37 is slidably mounted within a suitable bearing 38 formed in one side of the housing 1, while the other end thereof carries a guide pin 39 slidably mounted within a cylinder 40 attached to the side wall of the housing opposite the bearing 38.

The pin 39 carries a collar 41 and mounted upon the cylinder 40 and disposed between the collar 41 is a coil spring 42 which normally maintains the plunger 37 in a projected position, as shown in Figure 2, the outer end of the plunger 37 carries a hand knob 43 so that the plunger may be readily engaged by the hand for reciprocating the same.

Leading into the housing at one end thereof and in close proximity to the container 10 is a chute 44, having a bottom 45 and a slot 46 in one side thereof, while the dispensing opening 47 is formed in the other side of same. The slot 46 is of sufficient size to receive therethrough any one of the fillers 18.

Arranged in intimate contact within the chute 44 are the sanitary containers 48. These containers are constructed from the blank illustrated in Figure 6, with one side wall formed with a slot 49 to receive one of the fillers 18 into the container.

In constructing the containers 48, it will be noted that four of the end tabs are provided with spaced slits 50, forming a tongue 51 between the slits, and these tongues, when the containers are in floated position, as shown in Figure 2, are adapted to project into the container to form spacing members for the two outside layers 52 of the sandwich, so that the outside layers will be maintained in spaced relation for receiving therebetween any one of the fillers 18.

The opening 47 through which the containers are moved is normally closed by means of a pair of spring operated doors 53, but these doors can be urged to an open position through movement of the containers 48 when it is desired to dispense one from the chute 44.

Attached to the housing 1 just beneath the chute opening 47 are brackets 54 which support a platform 55 onto which the filled containers are moved when dispensed from the machine. Pivoted latches 56 extend upwardly through slots 57 in the platform 55 and are adapted to form suitable stops to prevent movement of the containers back toward the housing after being dispensed to a point beyond the latch members.

In the use of my improved machine, it will be apparent that the container 10 is first filled with a plurality of ready-cooked fillers 18, the containers 48 with the outside sandwich layers 52 in position are placed within the chute 44. A suitable amount of liquid grease is placed within a container 10 to retain the fillers in a heated condition. When it is desired to dispense a complete sandwich, the plunger 37 is forced inwardly, rocking arms 33 upon their pivots which in turn will move the dispensing fork forwardly between the guide rails 25. As the pusher plate 30 is normally maintained in a vertical position, as shown in Fgure 2, this plate will engage the topmost filler and force the same forwardly through the slot 46 between the two outside layers 52.

It will be noted that the side portions 26 of the dispensing fork pass upon each side of the filler, as shown in Figure 1, and enters the container with the filler whereby continued movement of the dispensing fork will cause the outer ends of the side portions 26 to engage the closed side of the container and force the container which contains the sandwich out through the opening 47, the action opening the doors 53, the container moved forwardly until it passes beyond the upper ends of the pivoted latches 56 where it will remain on the platform until removed. As soon as the container has been dispensed onto the platform 55 and the plunger 37 released, the tension of the coil spring 42 will return the plunger 37 to its normal position, illustrated in Figure 2, and at the same time retracting the dispensing fork, the pusher plate 30 which is pivotally mounted between the side portions 26 of the fork will move upwardly to the position shown in Figure 4 so that it will readily pass the uppermost filler now in the container 10. As each filler is dispensed, a suitable amount of water will pass into the container in order to cause the float 14 to rise, force the remaining fillers upwardly so that the filler next in order will be in dispensing position.

It will be apparent from the foregoing that I have provided a comparatively simple and inexpensive machine whereby sandwiches with hot fillers can be readily dispensed in suitable sanitary containers. While the fillers illustrated in the present instance are preferably of a hamburger type, it will be apparent that various types of fillers can be dispensed in the same manner.

I claim:

1. A dispensing machine including a main housing, a chute leading into the housing having a transverse opening therethrough, containers having an opening therein and adapted to be positioned in consecutive order in the chute so that the bottommost container will have its opening aligning with one of the openings in the chute, means in the container for supporting sandwich layers in spaced relation, means in the housing for supporting sandwich fillers, and means for moving said fillers to a position between the layers in the container and then forcing the containers from the chute.

2. In a machine of the class described, a main housing, a plurality of individual containers each having an opening in one side wall, means for supporting said container in superposed relation whereby the openings therein will face the interior of the housing, means in the containers for supporting sandwich layers in spaced relation, means in the housing for supporting a plurality of sandwich fillers whereby the uppermost filler is normally aligned with the opening in the container, means for consecutively feeding the fillers to the containers and forcing the containers from the housing.

3. A dispensing machine including a main housing, a plurality of individual containers each having an opening in one side wall, means for supporting said containers in superposed relation so that the openings therein face the interior of the housing, means in the containers for supporting sandwich layers in spaced relation, means in the housing for supporting a plurality of sandwich fillers in superposed relation, means for heating said fillers, means for consecutively moving said fillers through the openings in the containers to a position between the layers therein and then forcing the containers from the housing.

4. A dispensing machine including a housing having an opening, means for supporting sandwich layers in spaced relation adjacent the opening, means in the housing for containing and supporting a plurality of sandwich fillers in superposed relation with the uppermost filler normally aligned with the space between the sandwich layers, means for heating said fillers, means for moving said fillers from their normal positions to a position between the sandwich layers and then forcing the sandwich layers and the filler from the housing.

5. A dispensing machine including a housing, a liquid container within the housing, means for heating liquid within said container, a second container arranged within the first container and supporting a plurality of sandwich fillers in superposed relation, means for supporting in spaced relation a plurality of superposed sandwich layers, means for moving the fillers one at a time between two of the spaced layers and then forcing the filler and layers from the housing.

6. In a dispensing machine, a housing having an opening, means for supporting sandwich layers in spaced relation adjacent the opening, means in the housing for supporting in superposed relation a plurality of fillers, means for moving the fillers one at a time into position between the sandwich layers and then forcing the layers and filler from the housing.

7. In a machine of the class described, a housing having an opening, means for supporting sandwich layers in spaced relation adjacent the opening, means in the housing for containing and supporting a plurality of fillers with the uppermost filler aligned with the space between the sandwich layers, means for consecutively feeding the fillers between the sandwich layers and then forcing the layers and filler from the housing.

In testimony that I claim the foregoing I have hereunto set my hand at Milwaukee, in the county of Milwaukee and State of Wisconsin.

ALEXANDER L. LOEHR.